D. L. FAIRCHILD.
SPRING BALANCE SCALE.
APPLICATION FILED AUG. 10, 1914.
1,229,249.
Patented June 12, 1917.
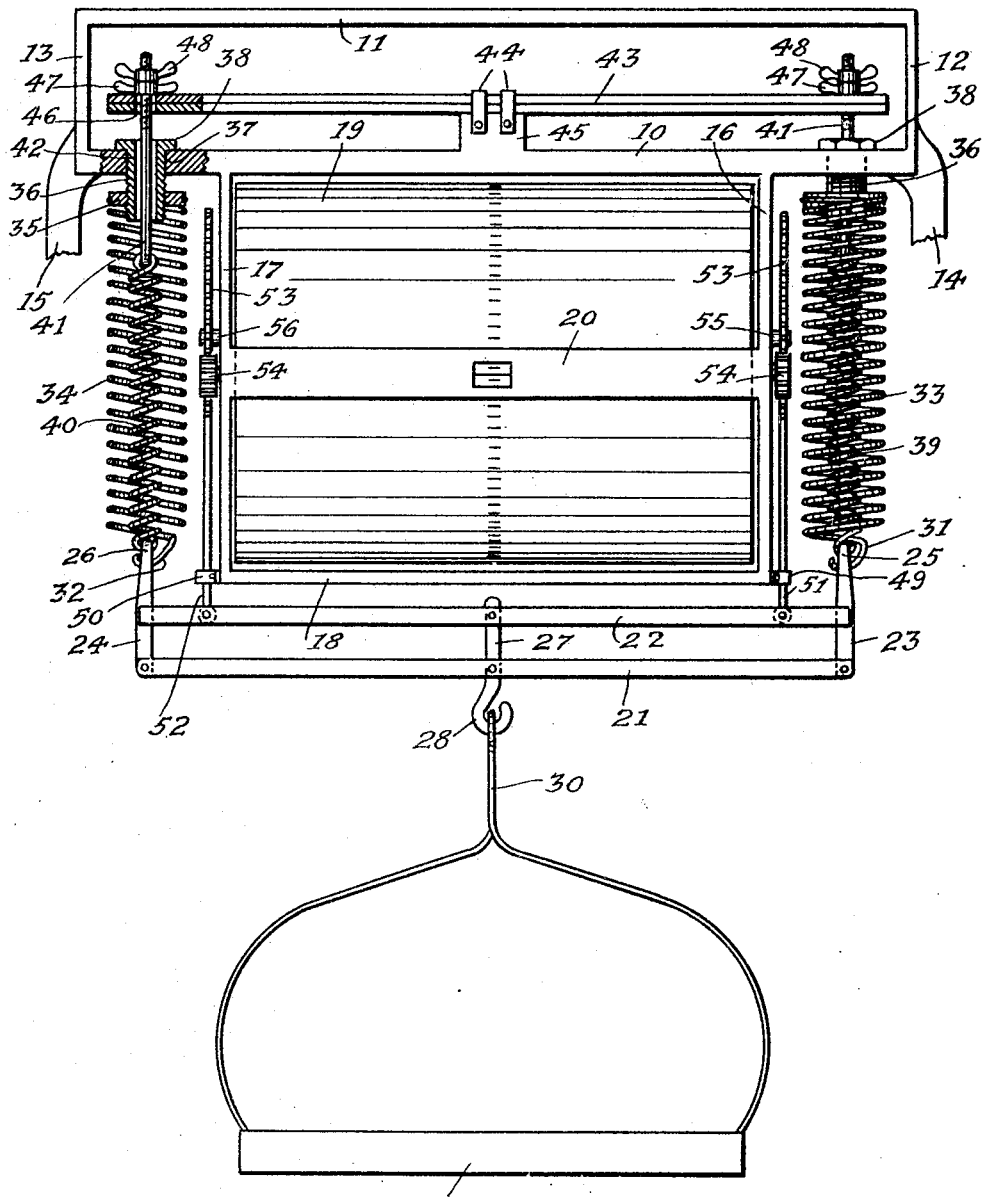
WITNESSES:
Theo. Lagaard
R. V. MacDonald
INVENTOR:
David L. Fairchild.
BY
F. A. Whitley
HIS ATTORNEY

UNITED STATES PATENT OFFICE.

DAVID L. FAIRCHILD, OF ELMHURST, ILLINOIS, ASSIGNOR TO HELEN O. FAIRCHILD, OF ELMHURST, ILLINOIS.

SPRING-BALANCE SCALE.

1,229,249.  Specification of Letters Patent.  Patented June 12, 1917.

Application filed August 10, 1914. Serial No. 855,948.

*To all whom it may concern:*

Be it known that I, DAVID L. FAIRCHILD, a citizen of the United States, residing at Elmhurst, in the county of Dupage and State of Illinois, have invented certain new and useful Improvements in Spring-Balance Scales, of which the following is a specification.

My invention relates to spring-balance scales of the type in which springs are employed, and indicating mechanism whereby not only the weight of the article is indicated but also the price at which it may be sold is computed. In scales of this character the load support (and, of course, the load thereon) are counterbalanced by coil springs. The movement of the load-supporting platform under the load, with its consequent distending of the spring, is communicated to an indicator, usually of cylindrical type, whereby the weight of the article and the price at which it is to be sold may be readily obtained. Inasmuch as the coil springs necessarily comprise an elongated metallic member which is subject to expansion and contraction under changes of temperature, the length of the spring or springs will be varied by changes in temperature so that a scale set to weigh accurately at one temperature would not, without compensating means, weigh accurately at another temperature. It is also true that the actual tensile strength of the spring or the force required to extend the same, and its consequent counterbalancing effect, varies with the temperature, irrespective of the lengthening or shortening of the spring thereby. It is essential, therefore, in obtaining a spring scale which will weigh accurately in various different temperatures to provide some kind of effective and self-acting means for regulating or controlling the effective force of the springs under different temperature conditions, so that the same weight will always move the platform support and distend the springs, and consequently move the indicator or rotate the cylinder, through the same distances at any of the different temperatures at which the scale may be used. I provide such means which, generally stated, consists of a thermostatic member acting directly upon at least a part of the springs counterbalancing the load support so as to affect such springs in a manner to cause the same to always have the same counterbalancing effect upon the load support in relation to the movement thereof at various temperatures.

The invention consists in certain novel details of construction and combinations and arrangements of parts, the novel features and full objects of which will appear in connection with the detailed description thereof, and are particularly pointed out in the claims.

In the drawing, illustrating the application of my invention in one form, the figure is an elevation view of a part of a scale, some parts being in section showing my invention applied thereto.

As illustrated, a top frame member is provided comprising extended bars 10 and 11 secured together in parallel relation by short end bars 12 and 13. This frame is carried by supports 14 and 15 in any of the well-known designs of scales. Hanger bars 16 and 17, connected at their bottoms by a longitudinal bar 18, constitute a frame in which the indicator cylinder 19 is journaled at its ends, a longitudinal reading bar 20 being shown as extending over the surface of said cylinder. A pair of supporting bars 21 and 22 are positioned below the bar 18 and are rigidly secured together by end pieces 23 and 24, having thereon upwardly-extended eye members 25 and 26 and a center piece 27 having a downwardly-turned hook 28 to which the material support 29 is movably attached by means of link 30. The members 25 and 26 each have connected therewith the lower ends 31 and 32 of counterbalancing coil springs 33 and 34, which are adjustably secured at their upper ends to nuts 35 threaded onto tubular hangers 36 extending through apertures 37 in the frame bar 10 and held thereon by means of collars 38 on the top of said hangers 36. The springs 33 and 34 comprise the main counterbalancing springs of the scale. Auxiliary springs 39 and 40 are also secured to the eye pieces 25 and 26 at their lower ends, and at their upper ends to eye bolts 41 extended through apertures 42 in the tubular hangers 36, the springs 39 and 40 being inside of the springs 33 and 34, as clearly shown. The eye bolts 41 are supported at their upper ends by a thermostatic bar 43 rigidly secured at its central portion by straps 44 to a standard 45 at the center of bar 10. The bolts 41 extend through apertures 46 in the thermostatic bar 43 and are adjustably held thereon by means of pairs of hand nuts 47 and 48, by which means the tension of springs 39 and 40 relative to that of springs 33 and 34 may be adjusted. The thermostatic bar 43 is a common form of thermostatic member comprising two strips of metal secured together along their sides, the respective metals having different coefficients of expansion, as brass and steel. As shown, the brass or more highly expansible metal constitutes the lower portion of the thermostat. It follows from this that when the thermostat is heated it will tend to curve so as to move its ends upwardly; and conversely when it is cooled it will tend to curve so as to move its ends downwardly.

Extending through guides 49 and 50 at the ends of bar 18 are rods 51 and 52, which are connected at their lower ends to bar 22 and are provided along the upper portions thereof with racks 53 held in engagement with pinions 54 on the shaft of cylinder 19 by means of keeper guides 55 and 56.

The operation of my thermostatic scale will be apparent. The load on the support 29 simultaneously moves bars 21 and 22 and distends the two sets of springs 33, 34 and 39, 40, respectively, until said load is counterbalanced, the movement of bars 21 and 22 being communicated through racks 53 and pinions 54 to the indicator cylinder 19. The major part of the counterbalancing effect, and consequently of the bearing of the load, is carried by the main springs 33 and 34 from their support upon bar 10. A portion of this load, however, is counterbalanced by springs 39, 40 supported from the thermostatic bar 43. This thermostat is of such a character that it moves the point of support of the springs 39, 40 under the effect of changes of temperature in opposition to the effect of such changes of temperature in lengthening the counterbalancing springs and in changing the tension characteristics thereof. That is, when the temperature changes by rising, and the consequent expansion of the supporting springs tends to increase the length thereof and reduce the tension strength of the springs, the thermostatic bar 43 will curve upwardly, lifting the point of support of springs 39 and 40 and tensioning said springs in respect to their operative effect in counterbalancing the load support to an extent sufficient to compensate for the otherwise changed relation of the movement of the load support directly and under a load in reference to the indicator drum 19. This compensation is such that whatever the temperature, the counterbalancing effect of the entire set of springs upon the load support and its loads remains constant, so that a given weight at any temperature within the normal range of operation of the scale will distend the springs and move the indicator the same distance.

The advantages of my invention will be clearly apparent. It is cheaply and efficiently constructed, may be readily adjusted to the highest weighing accuracy, and when so adjusted will produce the same degree of accuracy in its weighing efficiency at any temperature in which the scale may be used. The positioning of the auxiliary or thermostat controlled springs in the main counterbalancing springs renders the construction compact and practical, while the thermostat controlled springs provide a portion of the counterbalancing force so that the main springs may be correspondingly diminished in size.

I claim:

1. A scale comprising a framework embodying a top beam and depending arms, an indicating cylinder journaled in said depending arms, a thermostatic bar secured midway of its length to said framework, a load support having operative connection with the cylinder, and counterbalancing springs for the load support and the load carried thereby, all of said springs being connected with the load support and some of said springs being connected with the top beam and others of said springs being connected with the thermostatic bar at its ends respectively.

2. A scale comprising a framework embodying a top beam and depending arms, an indicating cylinder journaled in said depending arms, a thermostatic bar secured midway of its length to said top beam, a load support having operative connection with the cylinder, and counterbalancing springs extending on either side of the cylinder and connected with said thermostatic bar at its ends respectively.

3. A scale comprising a framework embodying a top beam and depending arms, a thermostatic bar secured to said top beam centrally in respect to said bar and said cylinder, a load support having operative connection with the cylinder, and counterbalancing springs for the load support and the load carried thereby extending past each end of the cylinder and connected with the respective ends of the thermostatic bar.

4. A scale comprising an indicating mechanism, a load support, counterbalancing springs on each side of said indicating mechanism for the load support and load carried thereby, and a thermostatic bar rigidly supported at its middle portion and having its ends connected with some of said springs to compensate for changes in the condition of said springs due to changes in temperature to which the springs are subjected.

5. A scale comprising a framework embodying a top beam and depending arms, a thermostatic bar secured to said top beam centrally in respect to said bar and said cylinder, a load support having operative connection with the cylinder, and sets of counterbalancing springs for the load support and the load carried thereby extending past the ends of the cylinder, a spring of each set being connected to the top beam and another spring of each set being connected to the ends of the thermostatic bar.

6. A scale comprising a framework embodying a top beam and depending arms, a thermostatic bar secured to said top beam centrally in respect to said bar and said cylinder, a load support having operative connection with the cylinder, and two sets of counterbalancing springs for the load support and the load carried thereby, each set comprising a pair of coiled springs one within the other extending past the ends of the cylinder, one spring of each set being connected to the top beam and one spring of each set being connected to the thermostatic bar.

7. A scale comprising an indicating mechanism, a load support, counterbalancing springs for the load support and load carried thereby, means for operating the indicating mechanism in fixed proportion to the extent of movement of the load support under its load, and a thermostatic bar fixedly held intermediate its ends and forming supporting points of attachment at its ends for some of said springs, said supporting bar being so mounted that increases in temperature will move said points of support away from the connection of the springs with the load support, and decreases in temperature will move said points of support toward said connections.

8. A scale comprising a frame, an indicating mechanism, a load support, a thermostatic bar fixed on the frame, counterbalancing springs for the load support and load carried thereby suspended directly from the frame, and auxiliary springs within said first-named springs connected with the load support and suspended from the thermostatic member.

9. A scale comprising a frame, an indicating mechanism, a load support, spring supports having central apertures carried by the frame, counterbalancing springs for the load support and load carried thereby connected with said spring supports, auxiliary springs within said first-named springs connected with the load support, and having supporting connections extending through said apertures, and a thermostatic member for controlling the position of the point of support of said supporting members.

10. A scale comprising a frame, an indicating mechanism, a load support, spring supports having central apertures carried by the frame, counterbalancing springs for the load support and load carried thereby connected with said spring supports, auxiliary springs within said first-named springs connected with the load support, a thermostatic bar fixed on the frame, and means extending through said apertures and connecting the auxiliary springs with the ends of the thermostatic member.

11. A scale comprising a frame, an indicating mechanism, a load support, spring supports having central apertures carried by the frame, counterbalancing springs for the load support and load carried thereby connected with said spring supports, auxiliary springs within said first-named springs connected with the load support, a thermostatic bar fixed on the frame, means extending through said apertures and connecting the auxiliary springs with the ends of the thermostatic member, and means for adjusting the effective length of said connecting means to vary the tension of the auxiliary springs effective upon the load support relative to that of the first-named springs.

In testimony whereof I affix my signature in presence of two witnesses.

DAVID L. FAIRCHILD.

Witnesses:
HENRY C. SCHUMACHER,
HARRY KOCHAISKY.

Copies of this patent may be obtained for five cents each, by addressing the "Commissioner of Patents, Washington, D. C."